Patented Aug. 18, 1942

2,293,376

UNITED STATES PATENT OFFICE 2,293,376

ALTERNATING CURRENT RECTIFIER OF THE COPPER OXIDE TYPE

Albert Leslie Williams, London, England, assignor, by mesne assignments, to The Union Switch and Signal Company, Swissvale, Pa., a corporation of Pennsylvania No Drawing. Application December 18, 1941, Serial No. 423,555. In Great Britain June 24, 1940

4 Claims. (Cl. 175—366)

This invention relates to alternating current rectifiers of the copper oxide type comprising a base of copper provided with a layer of cuprous oxide directly formed thereon and has for its object to provide an improved process of manufacture of rectifiers of this character which is more particularly applicable to rectifiers of relatively small capacity and dimensions.

In order to enable the necessary electrical connection to be effected with the cuprous oxide layer it is usual to coat the surface of this layer with carbon usually in the form of graphite applied in a colloidal form. In practice it is somewhat difficult to apply a carbon coating in this manner to rectifier elements of the small dimensions required, in the case, for instance, of radio-detectors without risk of the carbon coating spreading over the edge of the oxide layer and thus causing a short circuit or reduction in the reverse resistance of the rectifier element.

In accordance with the usual practice a metal contact plate or disc is applied to the carbon coated surface of the oxide layer and forms a contact element or terminal for the rectifier element, this contact plate being constituted by the metal base of the next adjacent rectifier element in cases in which the rectifier consists of a number of elements in series with one another and arranged in a column or stack.

According to the present invention the carbon coating instead of being applied to the cuprous oxide layer is applied to the contact plate or to the rear face of the next adjacent rectifier element which is in engagement with the oxide layer. The carbon coating can thus be applied over the whole face of the contact plate or its equivalent without risk of short circuit whereas if the carbon coating is applied to the surface of the cuprous oxide layer it is generally necessary to limit this coating to the central zone or portion only of the oxide layer for the same purpose.

When the contact plate or rear face of the copper base of the next adjacent element is thus coated with carbon and the plate or elements are assembled together it is found that satisfactory electrical connection with the copper oxide layer is effected.

Although as above stated the carbon coating may be applied over the whole surface of the contact plate or its equivalent it is preferable for the surface to which the coating is applied to be of slightly convex form as is the case when circular rectifier blanks or contact plates are produced by a punching operation from a metal sheet. The carbon coating is thus, when the rectifier elements are assembled, in contact only with the central portion of the adjacent oxide layer.

Again a coated stock sheet of relatively large area from which individual smaller rectifier elements are produced by punching or stamping may be arranged to have the carbon coating applied over the area of the whole sheet before separation into individual rectifier elements.

The invention may evidently also be applied to other forms of rectifiers in which the provision of a contact element or counter electrode is required.

The invention is not limited to the application of the carbon coating in any particular form or by any particular process and variations in this and other respects may be made without exceeding the scope of the invention.

Having now particularly described and ascertained the nature of my said invention and in what manner the same is to be performed, I declare that what I claim is:

1. The method of establishing electrical contact between copper oxide rectifier elements which are oxidized on one side only and which are to be stacked with the oxide surface of each element in contact with the non-oxidized surface of the next adjacent element which consists in applying a carbon coating to the non-oxidized surface of each element.

2. The method of obtaining contact with the oxide surface of a small copper oxide rectifier element which consists in applying a carbon coating to one face of a contact member and pressing the carbon coated face into engagement with the oxide surface.

3. The method of establishing electrical contact between copper oxide rectifier elements which are oxidized on one side only and which are to be stacked with the oxide surface of each element in contact with the non-oxidized surface of the next adjacent element which consists in forming each element with a surface which is slightly convex in form on the side which is not oxidized and applying a carbon coating to the convex surface.

4. The method of making electrical contact between the oxide layer of a copper oxide rectifier element and a contact plate which consists in forming the contact plate with a surface which is slightly convex in form, applying a carbon coating to said convex surface, and then pressing the coated surface into engagement with the oxide layer.

ALBERT LESLIE WILLIAMS.